April 18, 1933. C. J. R. H. VON WEDEL Re. 18,798
DISCHARGE TUBE
Original Filed March 7, 1928
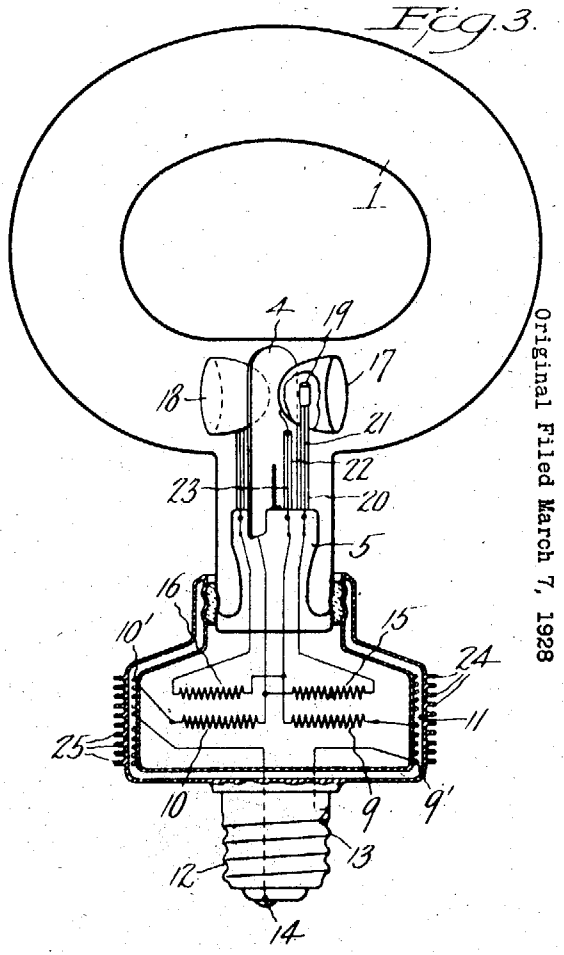
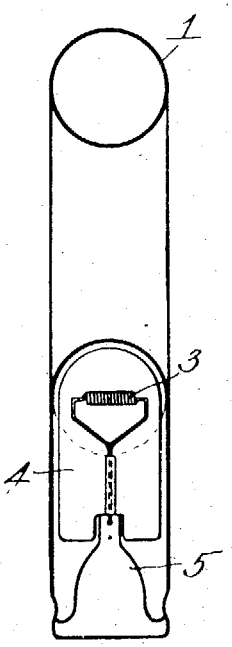
Fig. 2.
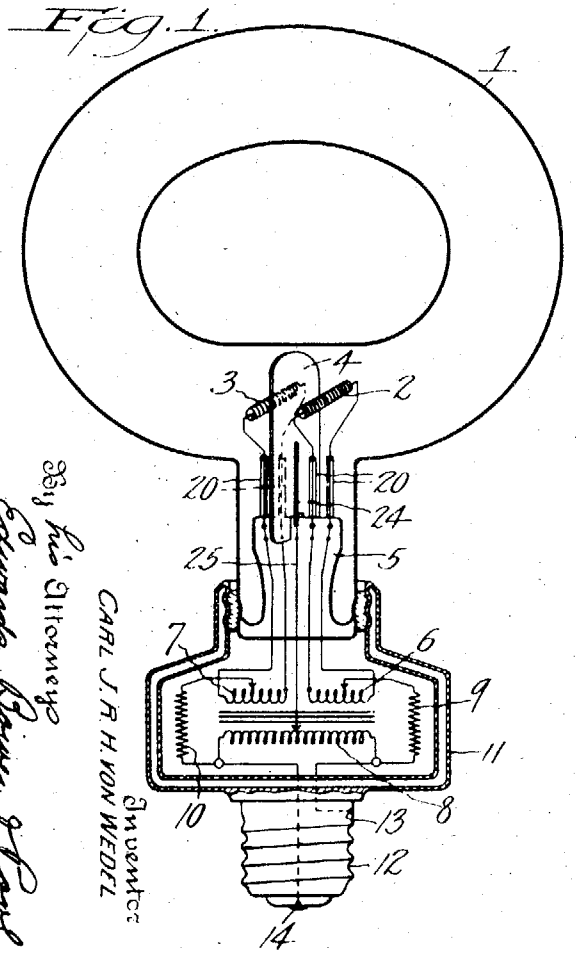
Inventor
CARL J. R. H. VON WEDEL
By his Attorneys
Edwards, Bower & Pool.

Reissued Apr. 18, 1933 Re. 18,798

UNITED STATES PATENT OFFICE

CARL J. R. H. VON WEDEL, OF NEWARK, NEW JERSEY, ASSIGNOR, BY MESNE ASSIGNMENTS, TO ELECTRONS, INC., A CORPORATION OF DELAWARE

DISCHARGE TUBE

Original No. 1,807,140, dated May 26, 1931, Serial No. 259,715, filed March 7, 1928. Application for reissue filed June 13, 1931. Serial No. 544,250.

The present invention relates generally to discharge tubes, and more particularly to structures and mounting arrangements for such tubes.

A particular object of the invention is to provide a discharge tube having a usefully long discharge path for desired purposes such as colored light tubes for advertising effects, ultra violet ray tubes, and the like, and yet can be connected for operation into a single electrical socket, such as the usual lamp sockets of lighting circuits.

A further object is an arrangement permitting close physical association of necessary discharge electrodes so shielded that the desired operating discharge can be directed over a desired long path and prevented in short direct paths necessary to the particular unitary construction herein contemplated.

The invention will be further understood by reference to the figures of the accompanying drawing in which like reference numerals represent like parts in so far as possible in the several figures.

Fig. 1 shows a discharge tube adapted for alternating current operation with electrode, shield and mounting arrangements embodying features of the invention.

Fig. 2 is a side view in section of the tube portion of Fig. 1 showing in further detail the electrode and shield arrangement.

Fig. 3 shows a discharge tube having the general features of the tube of Fig. 1, but modified as to the electrode arrangement with cooperating modifications in the supply circuits.

Referring to Fig. 1 a circular or otherwise suitably shaped tube 1 of glass or other suitable mateial for forming a discharge path is shown to include two discharge electrodes 2 and 3 erected on a stem 5 encompassing electrode lead-in wires usual to such tubes, the two electrodes being shielded from each other by a shield 4 so as to prevent a direct discharge between them, thus confining the desired discharge to and around the long and unobstructed path embraced by the tube structure.

The electrodes 2 and 3 are indicated as of the type adapted to emit electrons as by heating with a current passed through the wire forming these electrodes, the current of suitable potential being derived from the secondary windings 6 and 7 in the alternating current transformer arrangement indicated.

The electrode wires are constructed to be electron emitting, as by coating with electron emitting substances well known to the art or other suitable construction, such as using a wire of thoriated tungsten. Since many of the discharge tubes contemplated will have a gas-filling, as for example gas-filled tubes for colored light effects for advertising and the like purposes, and gas-filled tubes including mercury or like metallic vapors for producing ultraviolet rays, it is particularly desirable that an electrode structure that will withstand ionic bombardment be chosen for 2 and 3. For this reason a structure comprising a coating of electron emissive compounds, of the nature disclosed and defined in application Serial Number 196,996 filed in the U. S. Patent Office on or about June 6, 1927, by Freidrich Meyer and Hans Joachim Spanner, or layers of electron emissive compounds, of the nature disclosed and defined in application Serial Number 251,736 filed in the U. S. Patent Office on or about February 3, 1928, by Hans Joachim Spanner and myself as joint inventors, as the emissive material on a suitable metal core or wire is most suitable, as such compounds have been found capable of resisting ionic bombardment most effectively.

The shield 4 may be made of non-conductive material such as mica, or non-conductive material having a metallized surface, such as mica having a deposit of getter material, as magnesium, resulting from the deposit of such material on internal parts of a tube accompanying the usual degassing processes with getter materials; or may be a conductive material, such as nickel, molybdenum, or other suitable metals. The shield may be mounted on the glass stem 5 by means of an upright 24 inserted into the body of the glass stem and welded or otherwise suitably attached to the shield 4.

By reference to Fig. 2, it is seen that the shield 4 is made to fairly closely fill the cross-sectional area of the lower portion of tube 1 and the upright portion of that part of the tube surrounding the stem 5, but the shield is not shown to extend all the way to the bottom of the stem 5. It is not necessary that the shield have an absolutely tight fit at the walls of the tube or extend to the bottom of the stem portion of the tube to prevent a discharge directly between the electrodes 2 and 3 because in operation the shield, the glass walls thereabout, and the stem 5 collect on their surfaces electrical charges by reason of the electrons in the tube, which electrical charges have the effect of neutralizing ionic effects necessary to maintaining the discharge. For example, if a discharge attempts to take place between electrodes 2 and 3 by way of the path under the shield, the electrical charges accumulated on the shield, stem and glass walls of that portion of the tube surrounding the stem, have the effect of neutralizing ions to thereby prevent the successful establishment of a discharge by way of such path. The conditions of operation however, determine the closeness of fitting necessary for the shield, it being obvious that under conditions of employment of high discharge potentials more difficulty is had in preventing a discharge than under conditions of lower potentials. In the case of very high potentials, two shields paralleling each other would be more effective than one shield, and additional protection may be had by applying to these shields suitable potentials from outside sources. For example, the shield 4 is shown connected by way of upright support 24 and lead wire 25 through the stem 5 to the primary winding 8 of the transformer, as one means of applying to the shield a potential from the outside, or to control the potential of the shield in the matter of the charge collected thereon by reason of the electrons in the tube, for it may be that a charge so collected will have a potential so high as to interfere with the desired operation of the tube as a discharge device by way of the long path, and the connection shown would permit of leaking off the charge. For example, the lead wire 25 is shown connected to the mid-point of the primary winding 8, though it may be connected to other points on this winding or other sources of potential as desired, or connected through a resistance to determine the rate of leaking away of an internal charge.

The tube 1 is shown mounted in a base casing 11 to which is attached the usual electric lamp screw plug 12 employed in connection with the usual lighting socket. The base casing is shown to include an alternating current transformer having a primary 8 and secondaries 6 and 7, which secondaries determine the potential of the heating currents of electrodes 2 and 3. The iron core required by such a transformer can well be shaped to fit into a circular arrangement of base, or other suitable form, and carry thereon the necessary primary and secondary windings. The only energy that the transformer need handle is that required for heating the electrodes, and a few watts suffice for this purpose, so that the transformer and windings can be simple affairs of very fine wire.

The resistances 9 and 10 are inserted in series with a supply circuit leading to the electrodes 2 and 3, so that when a discharge takes place between these electrodes these resistances are in series with the discharge path, and by selecting these resistances of suitable values they determine the amount of current involved in the discharge. These resistances may be inserted inside the casing 11 wound in suitable form and on suitable structures to bring within the casing a sufficient length of resistance wire to obtain the needed amount of resistance. However, there is necessarily some heat generated in these resistances which must be satisfactorily dissipated. One satisfactory way of accomplishing the result would be to make the casing 11 of a double wall having sufficient spacing between the walls to permit of winding the resistance wire exteriorly of the inner wall and interiorly of the outer wall, which arrangement is shown more in detail in Fig. 3. As a further means of dissipating heat the outer wall may be provided with corrugations or cooling ribs in manner and of construction well known in the general practice of heat dissipation effects, also shown more in detail in Fig. 3.

Lead-in wires for energizing the primary winding 8 and energizing the electrodes 2 and 3 by way of resistances 9 and 10 connected to center points in windings 6 and 7 are indicated as suitably connected at points 13 and 14 of the screw plug arrangement 12 in a manner already well known in electric lamp practice.

The arrangement shown can be inserted into the usual light socket, so that closing the switch or pressing the wall button usually associated with lighting systems will, in the one operation, permit of heating the electrode wires 2 and 3, and at the same time apply a difference of potential between these electron emitting electrodes, and since the discharge cannot take place in the short interval of separation because of the shield 4, a discharge is set up between these electrodes by way of the long path around the tube, resulting in the desired light or other effects sought from such a discharge.

The electron emitting electrodes have the effect of substantially eliminating the usual cathode drop present in such tubes, leaving the resistance of the discharge path and the anode drop as the resistances to be overcome in creating the desired discharge, and since these resistances are reasonably low in tubes having gas pressures giving the desired colored light and other effects wanted in such tubes, a reasonably long discharge can be obtained with the electrical potentials available from usual commercial circuits.

Since the two electrodes 2 and 3 are electron emitting, the arrangement operates most readily with alternating current, the electrodes acting alternately as cathodes and anodes, and also permit the starting of the new discharge at each half cycle of alternating current early in the building-up of the potential of each half cycle, a feature most desirable in eliminating flicker effects common to usual tubes operated by an alternating current source.

The arrangement in Fig. 3 is similar to that in Fig. 1 in the features permitting employing the tube in connection with a single socket. The arrangement differs from that of Fig. 1 in providing for electrodes 17 and 18 which are normally cold, but are heated for starting operation and in part during operation by an ionic bombardment between the main electrode 17 and auxiliary electrode 19 and main electrode 18 and corresponding auxiliary electrode (not shown).

As in the case of Fig. 1, resistances 9 and 10 are connected in series with the main discharge path to limit the operating value of the discharge current to a desired degree, a part of the total resistance being shown as resistance winding 9′ in series with resistance 9 wound between the inner and outer walls of the casing 11, and resistance winding 10′ in series with resistance 10 also wound between the inner and outer casings. Of course all of the resistance in each circuit may be wound either within the casing or within the space between the walls, and the same may be done with resistances 15 and 16. Cooling flanges or ribs on the outer wall of the casing 11 indicate one aid to dissipating heat generated in the resistances and other elements within the casing.

There are also included resistances 15 and 16 in series with each of the auxiliary discharge paths between the main electrodes 17 and 18 and the corresponding auxiliary electrodes. These resistances 15 and 16, in usual construction, will be much larger in resistance values than resistances 9 and 10, both because of the proximity of the auxiliary electrodes to the main electrodes and because normal operation will not require as large an auxiliary discharge for starting and heating purposes as is required in the main discharge. Again, the starting discharge may require a fairly large current, but which is not needed once starting has taken place and the main discharge is operating to provide the electrode heating. The arrangement shown so connects the resistances 15 and 16 with relation to the main discharge circuit and the resistances 9 and 10 therein that once the main discharge has taken place, the current in the auxiliary discharge paths is limited, all as more fully explained in my copending application, Serial No. 254,921, filed February 17, 1928.

In Figs. 1 and 3 the inlead wires to the main and auxiliary electrodes are indicated as surrounded by small glass tubes or other suitable insulating material 20, this to prevent destructive discharges impinging upon these more or less fragile elements of the arrangement.

Because of the alternating current transformer arrangement in Fig. 1, a tube arrangement so constructed can only be operated with alternating current. The arrangement in Fig. 3 permits of operating with both alternating and direct current. If operated with direct current obviously one of the main electrodes permanently acts as a cathode and the other as an anode. The use of resistances only in the arrangement of Fig. 3 simplifies the matter of including all of the required control elements within a single simply constructed base.

I claim:

1. A discharge tube having a single stem portion, a stem in said portion, a pair of electrodes erected on said stem, a hollow toroidal envelope mounted upon said stem portion and forming a continuous elongated discharge path extending in two directions from said stem portion, and a discharge preventing shield between said electrodes whereby discharges therebetween are confined to said elongated path.

2. A discharge tube including a ring-shaped portion, a stem portion opening into said ring-shaped portion, a stem within said stem portion, a pair of electrodes erected on said stem so as to project into said ring-shaped portion, and a discharge preventing shield erected on said stem between said electrodes and their supports, whereby discharges between said electrodes are confined to the long path around the ring-shaped portion of said tube.

3. A discharge tube including a tubular portion closed upon itself, a stem portion opening therein, a stem within said portion, a pair of electrodes erected on said stem so as to project into said tubular portion, and a discharge preventing shield for ionic isolation of said electrodes except by way of the long path around said tubular portion.

4. A discharge tube including a tubular portion closed upon itself, a stem portion opening into said tubular portion, a pair of electrodes projecting from said stem portion into said tubular portion, and a discharge preventing shield for ionic isolation of said electrodes except by way of the long path around said tubular portion.

5. The combination of a discharge tube having an elongated discharge path portion toroidal in shape, a single stem portion opening into said elongated portion, a pair of discharge electrodes extending into said discharge portion from said stem portion, a discharge preventing shield between said electrodes, connections to said electrodes leading externally of said tube by way of said stem portion, a base and circuit connecting portion affixed to said stem portion, and current controlling elements within said base in extension of said connections to said electrodes.

6. The combination of a discharge tube including a tubular portion closed upon itself, a stem portion opening into said tubular portion, a plurality of electrodes extending into said tubular portion from said stem portion, connections to said electrodes leading externally of said tube by way of said stem portion, a base affixed to said stem portion, current controlling elements within said base in extension of said connections to said electrodes, and means affixed to said base for connecting said current controlling elements to an electrical circuit outlet.

7. The combination of a discharge tube including a plurality of electrodes, connections to said electrodes leading externally of said tube, a base affixed to said tube and having a plurality of spaced walls, the outer of which carries heat radiating fins, current controlling elements in circuit with said electrodes by way of said external connections including resistance arranged within the space between said double walls of said base, and means affixed to said base for connecting said current controlling elements to an electrical circuit outlet.

8. A discharge tube including a tubular portion closed upon itself, a stem portion opening into said tubular portion, a pair of electrodes projecting from said stem portion into said tubular portion, a discharge preventing shield between said electrodes, and a potential determining connection to said shield leading externally of said tube.

9. In a glow discharge device, a transparent envelope consisting of a transparent tubular member of relatively small cross-section, said tubular member being bent and the ends thereof sealed to each other, a stem portion opening into said tubular member, a stem within said portion, a pair of electrodes erected on said stem and extending within said tubular member and an electrostatic shield mounted on said stem and substantially preventing any straight line discharge between the electrodes.

10. In a discharge tube, a stem, a pair of electron emitting electrodes supported thereby, a conductive shield interposed between said electrodes, an envelope enclosing said electrodes and forming with said shield an elongated main discharge path between said electrodes away from said shield, and an impedance electrically connected to said electrodes and to said shield.

11. In a discharge tube, a stem, a pair of electron emitting electrodes supported thereby, a conductive shield interposed between said electrodes, an envelope enclosing said electrodes and forming with said shield an elongated main discharge path between said electrodes away from said shield, and an impedance electrically connected to said electrodes, said shield being electrically connected to the midpoint of said impedance.

12. In a discharge tube, a stem, a pair of electron emitting electrodes supported thereby, a conductive shield interposed between said electrodes, an envelope in tubular form, the ends of which respectively surround said electrodes and said shield and form an elongated main discharge path between said electrodes and away from said shield, and an impedance electrically connected to said electrodes, said shield being electrically connected to the midpoint of said impedance.

13. In a discharge system, a stem, a pair of electron emitting electrodes supported thereby, a conductive shield interposed between the electrodes, an envelope enclosing said electrodes and forming with said shield an elongated main discharge path between said electrodes and away from said shield, and means comprising conductive connections between said shield and said electrodes for controlling the potential of the shield relative to the more negative electrode during each half cycle of alternating potential applied between said electrodes.

14. In a discharge system, a stem, a pair of electron emitting electrodes supported thereby, a conductive shield interposed between the electrodes, an envelope enclosing said electrodes and forming with said shield an elongated main discharge path between said electrodes and away from said shield, and means comprising conductive connections between said shield and said electrodes for controlling the rise of potential between the more negative of said electrodes and said shield to insure early starting of the discharge between said electrodes during each half cycle of alternating potential applied thereto.

15. A discharge system comprising a pair of heatable electron emissive electrodes each adapted to be alternately cathode and anode, a conductive shield obstructing the direct path between said electrodes, an envelope enclosing said shield and electrodes and providing an unobstructed discharge path between said electrodes of greater length than the direct path therebetween, an ionizable atmosphere in said envelope, and means comprising conductive connections between said shield and said electrodes for controlling the potential of the shield relative to the more negative electrode.

16. In a discharge system, a stem, a pair of electron emitting electrodes supported thereby, a conductive shield interposed between the electrodes, an envelope enclosing said electrodes and forming with said shield an elongated main discharge path between said electrodes and away from said shield, and means comprising conductive connections including a current limiting impedance between said shield and said electrodes for controlling the rise of potential between the more negative of said electrodes and said shield to insure early starting of the discharge between said electrodes during each half cycle of alternating potential applied thereto.

Signed at New York, county and State of New York, this 12th day of June, 1931.

CARL J. R. H. VON WEDEL.